United States Patent [19]

Wlodarczyk

[11] Patent Number: 4,932,262
[45] Date of Patent: Jun. 12, 1990

[54] MINIATURE FIBER OPTIC PRESSURE SENSOR

[75] Inventor: Marek T. Wlodarczyk, Birmingham, Mich.

[73] Assignee: General Motors Corporation, Detroit, Mich.

[21] Appl. No.: 371,155

[22] Filed: Jun. 26, 1989

[51] Int. Cl.$^5$ .................... G01L 7/08; G01L 9/00
[52] U.S. Cl. ........................... 73/705; 73/708; 250/227.23; 250/231.19
[58] Field of Search .............. 73/705, 708; 250/231 P, 250/227; 374/243

[56] References Cited

U.S. PATENT DOCUMENTS

| | | | |
|---|---|---|---|
| 4,142,774 | 6/1977 | Wright | 350/96.12 |
| 4,268,116 | 5/1981 | Schmadel et al. | 350/96.29 |
| 4,360,247 | 1/1981 | Beasley | 350/96.15 |

FOREIGN PATENT DOCUMENTS

| | | | |
|---|---|---|---|
| 3236435 | 4/1984 | Fed. Rep. of Germany | 73/705 |
| 1076787 | 2/1984 | U.S.S.R. | 73/705 |

OTHER PUBLICATIONS

*Research Disclosure,* Dec. 1988, Microbend Optical Pressure Sensor in Spark Plug.

*High Technology,* vol. 2, No. 4, Jul./Aug. 1982, pp. 49–56, Fiber Optics Turns to Sensing.

*Primary Examiner*—Donald O. Woodiel
*Attorney, Agent, or Firm*—Robert M. Sigler

[57] ABSTRACT

A pressure sensor comprises a chamber formed from two members micromachined in silicon or a similar substance. The members define a chamber with at least one pressure sensitive membrane and an optic fiber extending through the chamber parallel to the membrane. The membrane has an optical grating formed thereon which may be coated with a surface plasmon supporting substance. Light is injected into the fiber with a wavelength that couples with the grating on the membrane, either in a Bragg relationship or in coupling to a surface plasmon. The coupling, and thus the light lost from the fiber, varies with separation between the membrane and fiber and thus with the pressure outside the chamber. The members may also include a thicker wall which is not pressure sensitive but which couples with an identifiably distinct portion of the light in the optic fiber to provide a temperature compensated reference. The pressure sensor can be made very small and rugged for combustion chamber pressure sensing in an engine and for other uses where very small pressure sensors are required.

5 Claims, 3 Drawing Sheets

MINIATURE FIBER OPTIC PRESSURE SENSOR

BACKGROUND OF THE INVENTION

This invention relates to a miniature pressure sensor using a fiber optic element for use where the pressure sensor must be very small. Such a sensor may be particularly adapted for combustion pressure measurements in a combustion chamber of an internal combustion engine by inclusion within a spark plug. It must be small and sufficiently rugged to withstand the high temperatures and pressures in a combustion environment; but it must be inexpensive to manufacture if mass production is contemplated.

SUMMARY OF THE INVENTION

This specification discloses and claims a pressure sensor of the type described above which is micromachined in silicon or a similar substance for operational ruggedness and low expense in large quantities. Its operation is based on the variation of proximity coupling between an optic fiber and a surface wave on an optical grating; and the structure can thus be much smaller than, for example, an optic fiber sensor of the microbend type. It may further include additional elements for temperature compensation.

In particular, the invention is a pressure sensor comprising a pair of wall members, at least one of the wall members having a membrane portion surrounded by a rim. The pair of wall members are joined with the rim of the one wall member in a sealing arrangement with the other wall member to form a chamber therebetween sealed from the outside environment with a reference pressure therein. At least a portion of the membrane portion of the one wall member is sufficiently thin to allow flexure with variations in pressure in the outside environment relative to the reference pressure in the cavity and having an optical grating formed thereon with a predetermined periodicity.

The pressure sensor further comprises optic fiber means extending through the cavity adjacent and parallel to the membrane portion and sufficiently close thereto to allow coupling of light of a predetermined frequency therein to the optical grating and means for generating and providing to the optic fiber means light of the predetermined wavelength having a coupling relationship to the periodicity of the optical grating such that loss of light from the optic fiber means varies with the separation between the optic fiber means and wall portion and thus with the pressure of the outside environment relative to the reference pressure.

The pressure sensor further comprises light detection and signal generating means effective to sense the amount of light of the predetermined wavelength conducted through the optic fiber means in comparison with a reference indicative of the amount of light provided to the optic fiber means and generate a signal therefrom varying with pressure outside the chamber.

The pressure sensor may use various forms of coupling to forward or backward propagating waves, including Bragg coupling or coupling to a surface plasmon. The pressure sensor may also include a thick wall which couples with an identifiably distinct portion of the light in the fiber optic means to provide a temperature compensated reference for the output. Further details and advantages of the invention will be apparent from the accompanying drawings and following description of a preferred embodiment.

DETAILED DESCRIPTION OF THE PREFERRED EMBODIMENT

Figure 1:
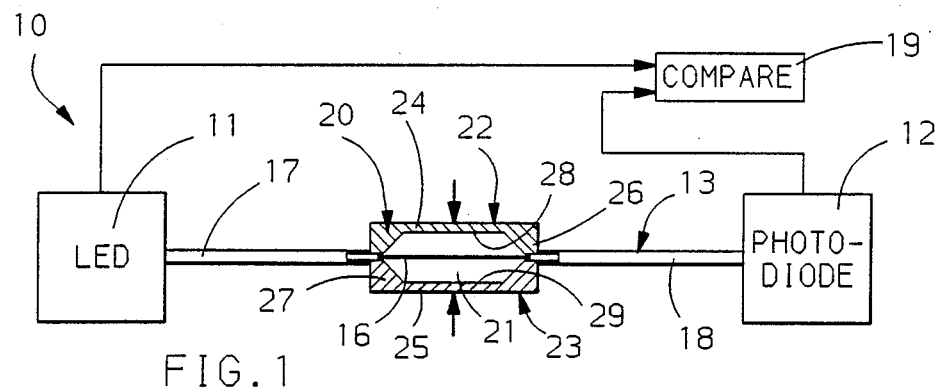
FIG. 1 is a schematic diagram of a micromachined fiber optic pressure sensor.

Referring to FIG. 1, a pressure sensor 10 comprises an optical source 11 such as an LED or laser diode which provides light to a light detector 12 such as a photodiode through a single mode optic fiber 13. A portion 16 of optic fiber 13 is contained within a cavity or chamber 21 defined within a housing 20; and additional portions 17 and 18 of optic fiber 13 extend from LED 11 to housing 20 and from housing 20 to photodiode 12, respectively. For convenience, portions 16, 17 and 18 of the optic fiber 13 may be separate optic fibers coupled together by standard coupling means; and they will be so identified throughout the remainder of this specification. Housing 20 may be formed from two wafers 22 and 23 having membranes or walls 24 and 25, respectively, surrounded by rims 26 and 27, respectively. Membranes 24 and 25, together with rims 26 and 27, define recesses 28 and 29 which, when wafers 22 and 23 are assembled as shown, define chamber 21. Optic fiber 16 has its cladding stripped or thinned within chamber 21 so as to couple with light coupling means, to be described, on the inner surfaces of membranes 24 and/or 25 extending parallel to optic fiber 16. Flexure of portions of membranes 24 and/or 25 with variations of pressure outside housing 20 causes variations in the distance between such portions and the optic fiber and thus in the coupling of at least one identifiably distinct portion of the light from optic fiber 16 to the flexing portions of membranes 24 and/or 25. The amount of this identifiably distinct portion of the light passed through the fiber, as sensed by photodiode 12, is compared in suitable apparatus 19 with a reference, which may comprise the amount of this identifiably distinct portion of the light injected into the fiber, to determine the pressure outside chamber 21. Alternatively, as described below, there may be other portions of membranes 24 and/or 25 which are thick so as to not flex significantly with pressure and which couple with another identifiably distinct portion of the light in optic fiber 16 so as to provide a temperature compensated reference signal in the amount of the other identifiably distinct portion of the light passed through the fiber or a separate fiber, which amount is substituted as the reference to apparatus 19.

Wafers 22 and 23 of housing 20 are made of a micromachinable material, that is, a material suitable for the well known micromachining techniques used by the solid state electronics industry for manufacturing semiconductor products. Silicon is a preferred example of such a material. Other materials which may be used include germanium, gallium arsenide and indium phosphide. Such materials, especially silicon, can be micromachined to form cavities which make cavity 21 upon assembly of the sensor, form V-grooves to receive optic fiber 16 and form gratings comprising multiple parallel V-grooves of periodicity as small as 0.5 micron. Silicon, especially, has good mechanical properties for a pressure sensing mechanism. It is resistant to high temperatures and the harsh environment of an engine combustion chamber; and its length can be reasonable for small micromachined sensors. Another alternative material is quartz, a particular form of silicon dioxide. Between silicon and quartz, silicon has the advantage of better micromachining characteristics; with silicon capable of being micromachined by preferential etching, in which the crystallographic planes of the substance itself are used to form the etched surfaces. However, quartz, which is not now appropriate for preferential etching but which may be micromachined by reactive ion etching with somewhat larger etched features, has the advantage of closer temperature matching with optic fibers.

One of the wafers 22 and 23 is inverted and affixed to the other to form chamber 21, which is sealed from the environment outside housing 20. Optic fiber 13 may be, for engine combustion pressure applications, an aluminum coated single mode optic fiber designed for high temperatures (300°–500 degree C.) but may be any suitable optic fiber for applications not requiring such high temperature capability. Optic fiber 16 may cross cavity 21 once, as shown, or a plurality of times for higher sensitivity, if desired. Recesses need not be formed in both wafers. Alternatively, a single such wafer with a recess may be affixed to a flat surface of a silicon chip to form a pressure sensor on the chip.

In the case of silicon, the surfaces of rims 26 and 27 to be affixed in a sealing relationship may be passivated with silicon dioxide or a similar substance and the parts then electrostatically bonded. In the case of quartz, the parts may be electrostatically bonded without prior passivation. Optic fiber 13 may enter chamber 21 through a V-groove, not shown, which is etched across the rim of the wafer. Such a groove is preferably formed by preferential etching, which allows formation of a suitably small groove having an angle determined by the crystal structure of the silicon. Grooves may be formed in both members or in the only one and may be coated with silicon dioxide for electrostatic bonding to the optic fiber laid therein.

Figure 2:
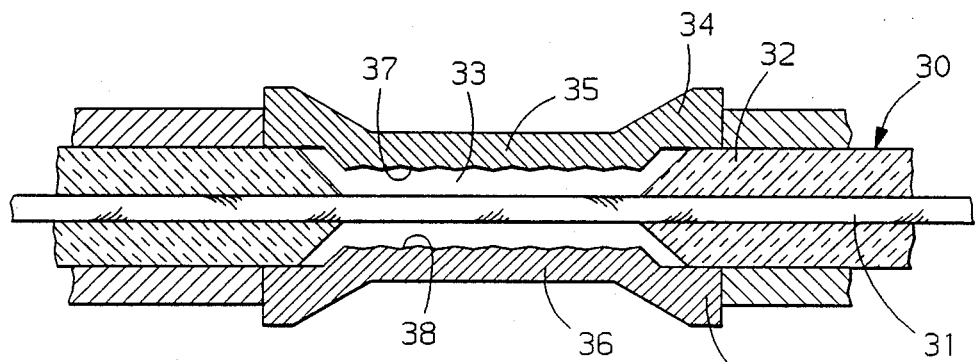
FIG. 2 shows an axial section view of a portion of the pressure sensor of FIG. 1 using gratings.

FIG. 2 shows a specific embodiment of a housing with light coupling means on the walls in the form of optical gratings. Optic fiber 30 comprises a core 31 with cladding 32 stripped within chamber 33 defined by silicon walls comprising membranes 35 and 36 surrounded by rims 34 and 39, respectively. Rims 34 and 39 are sealingly joined around the periphery of chamber 33 to seal it from the outside environment and establish a reference pressure therein. The inner surfaces of membranes 35 and 36 are provided with micromachined gratings 37 and 38, respectively, aligned for optical coupling with core 31: that is, with grating lines substantially perpendicular to core 31. The gratings are etched in the form of parallel V-grooves similar to a chain of mountains in the surface of the wall. The grooves are preferably V shaped but may alternatively be trapezoidal, with flat bottoms between the sloping valley sides. The V shaped grooves are shown in the Figures. Preferential etching is, at the present time, necessary to achieve periodicities as small as 0.5 micron.

The coupling phenomenon is the coupling of a guided wave in core 31 to a surface wave along the gratings; and, to this end, the gratings may be coated with a surface wave supporting substance such as silver or gold to increase the coupling. The coupling decreases with increased separation between the outer surface of core 31 and membranes 24 and 25, essentially to zero within several wavelengths of the light used, so membranes 24 and 25 must be within a few wavelengths of core 31. Membranes 24 and 25 are not, however, in contact with core 31 but are free to flex closer or farther therefrom. The use of silicon or the similar substances mentioned above allows the walls to be accurately machined with gratings and thickness on this dimensional scale. Under increased pressure from outside chamber 21, membranes 35 and 36 deflect inward and move gratings 37 and 38 closer to core 31, thus increasing the optic coupling and the light loss from core 31. With reduced pressure from outside chamber 21, the reference pressure in chamber 21 flexes membranes 24 and 25 outward farther from core 31 for reduced coupling therewith and thus reduced light loss from core 31. The walls are formed with thickness appropriate for the amount of flexing required in the expected pressure range. The ratio of light out ($P^{out}$) to light in ($P^{in}$) is a function of the separation s between core 31 and the relevant wall 35 or 36 and the coupling or interaction length L between core 31 and the wall:

$$P^{out} = P^{in} \exp(-skL),$$

wherein k is a geometry dependent coupling factor. The decrease in light transmitted through core 31 is detected by photodiode 12, which generates a pressure signal by comparing $P^{out}$ to the reference $P^{in}$. The sensitivity can be controlled by varying the coupling or interaction length L.

The precise coupling mechanism is determined by the relationship between the periodicity of the grating and the frequency of the light in core 31. If the first order Bragg equation is satisfied, $$W = 4(pi)/B_g,$$

wherein W is the wavelength, pi is the geometric constant and $B_g$ is the axial component of the wave vector in the optic fiber, a back reflection is produced. Gratings of this size, approximately 0.5–1.0 micron, required state of the art lithographic techniques in silicon or a similar material. If the second order Bragg equation is satisfied, $$W = 8(pi)/B_g,$$

both a back scattered guided mode and a radiation wave propagating normally to the fiber are excited. The latter produces the strongest coupling and therefore the most attenuation of a guided wave. For gratings of intermediate periodicities, radiation waves will be excited leading to weaker effects.

Figure 6:
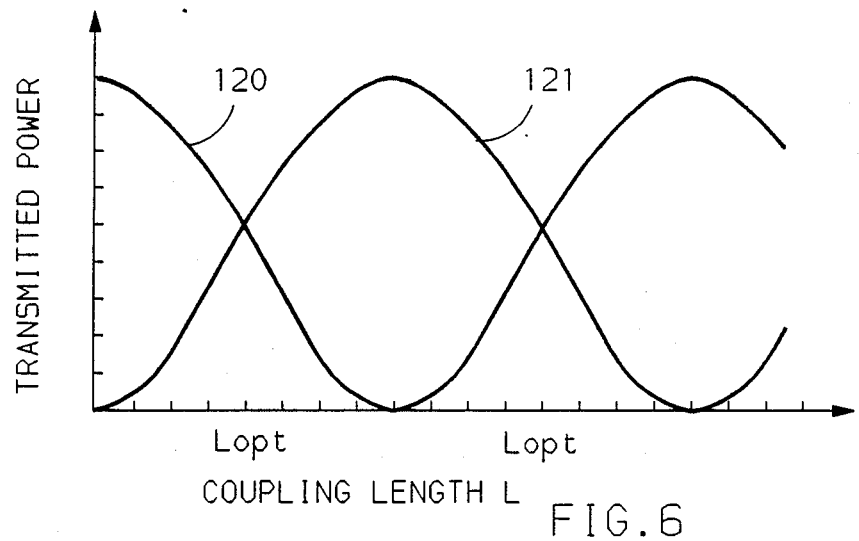
FIG. 6 is a graph which shows the periodic variation of optic power generated inside and outside an optic fiber in a micromachined fiber optic pressure sensor as a function of coupled length to illustrate optimal coupled lengths.

A similar configuration will support coupling between a guided wave and a surface plasmon. For this mode, the grating surfaces must be coated with silver, gold or a similar plasmon support substance. A grating is needed to couple between the plasmon and the guided wave. Because a surface plasmon is strongly attenuated due to metal losses, a strong attenuation of the guided wave occurs. A forward wave can be excited in a surface plasmon using a grating of much larger periodicity (tens or hundreds of microns), which grating is much easier to produce and would permit a housing made of quartz. In addition to a forward propagating plasmon, radiation waves are excited by the grating which further attenuate the guided wave. In forward coupling, it is necessary to carefully control the interaction or coupling length L. Because energy is periodically exchanged between coupled waves (with possible attenuation due to absorption or radiation losses), the coupling length should be located at an optimum sensitivity point. FIG. 6 includes curve 120, which shows the periodic variation with coupling length of power transmitted in the optic fiber, and curve 121, which shows the periodic variation of power transmitted outside the optic fiber. The curves are essentially sine waves 180 degrees out of phase; and the optimum coupling lengths $L_{opt}$ occur where they intersect, so that the transmitted power inside and outside the optic fiber is substantially equal. For backward propagating plasmons, fine gratings with periodicities on the order of those meeting the Bragg equations are required. Plasmons, however, produce strong coupling for high sensitivity.

However, silicon and similar materials are subject to expansion and contraction with temperature. Although the effect is not larger, it is significant in comparison with the scale of pressure induced flexing to be sensed, which flexing is on the order of magnitude of a wavelength of the light used in the optic fiber. For engine combustion chamber use, the temperature clearly has a large variation. However, even for uses which do not involve such large temperature changes, such as biomedical uses, some temperature compensation will generally be useful, since the dimensions of the sensor itself and the pressure variations to be measured may be considerably smaller than in engine applications.

Therefore, a portion of at least one of the walls forming the housing may be made sufficiently thick that its flexure with pressure is several orders of magnitude lower than another portion but its temperature variation is similar. This section of wall may be used for a temperature compensated reference, since it will change size with temperature only, as long as the portion of the light coupling to the temperature compensating portion of the wall(s) is kept identifiably distinct from that portion of the light coupling to the pressure flexing portion of the wall(s). Several embodiments are shown in FIGS. 3 through 5.

Figure 4:
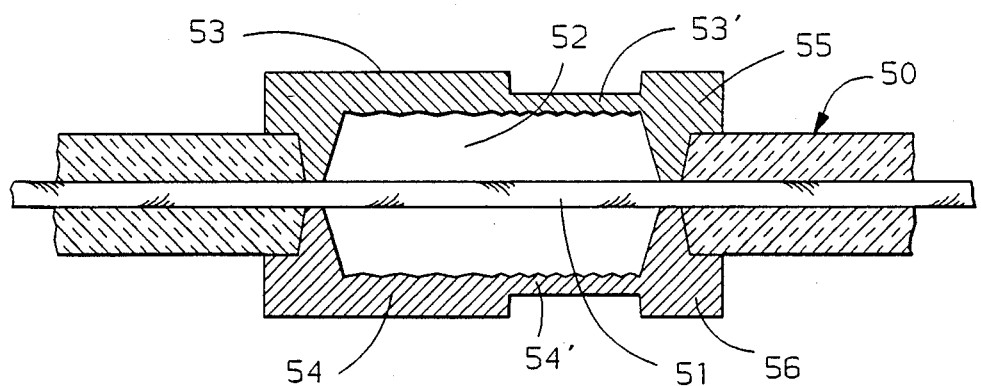
FIG. 4 shows an axial section view of a portion of another alternative embodiment of a micromachined fiber optic pressure sensor having thick and thin portions of walls on opposing sides of a single optic fiber.

In FIG. 4, an optic fiber 50 comprises a core 51 extending through a chamber 52 defined by a first wall with a rim 55 surrounding a membrane comprising a thick portion 53 and a thin portion 53' and a second wall with a rim 56 surrounding a membrane comprising a thick portion 54 and a thin portion 54'. Thick portions 53 and 54 do not flex much with pressure and therefore serve as temperature compensating elements for thin portions 53' and 54'. The gratings on thick portions 53 and 54 correspond to a first wavelength of light guided through core 51; and the gratings for thin portions 53' and 54' correspond to a second wavelength of light guided through core 51. The two wavelengths of light, which can be obtained from two LED's or laser diodes, are each chosen for Bragg reflection or coupling between a waveguide and a surface plasmon and can be separated by known techniques at the receiving end and applied to two photocells. The light intensity of the first wavelength, which comprises the temperature compensated signal, is used as a temperature compensated reference for the light intensity at the second wavelength (if there is no temperature variation, the light intensity at the first wavelength varies only with the intensity of the light supplied). It is important that the supplied light intensities at the first and second wavelengths, if allowed to vary, maintain a constant ratio with each other. This can be accomplished, for example, by using a single, multiple frequency light source or by using separate light sources with a single power supply.

Figure 5:
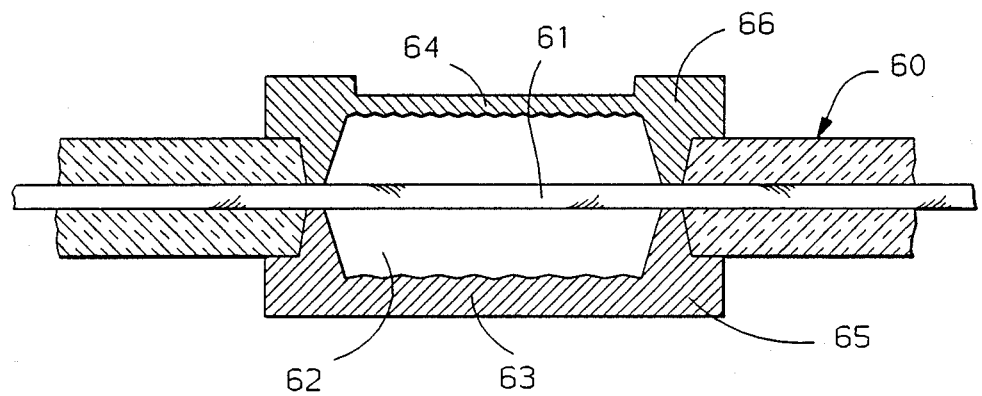
FIG. 5 shows an axial section view of a portion of another alternative embodiment of a micromachined fiber optic pressure sensor having thick and thin walls on opposing sides of a single optic fiber.

FIG. 5 shows another embodiment of temperature compensation. In this sensor, an optic fiber 60 has a core 61 extending through chamber 62 defined by a wall comprising a rim 65 surrounding a thick membrane 63 and a wall comprising a rim 66 surrounding a thin membrane 64, membranes 63 and 64 being parallel to and on opposite sides of core 61 of optic fiber 60. As in the previous embodiment, the thick and thin membranes are provided with gratings of different periodicity which correspond with two distinct wavelengths in the light within core 61. Thus the wall with thick membrane 63 can serve as a temperature compensation element for the wall with thin membrane 64.

Figure 3:
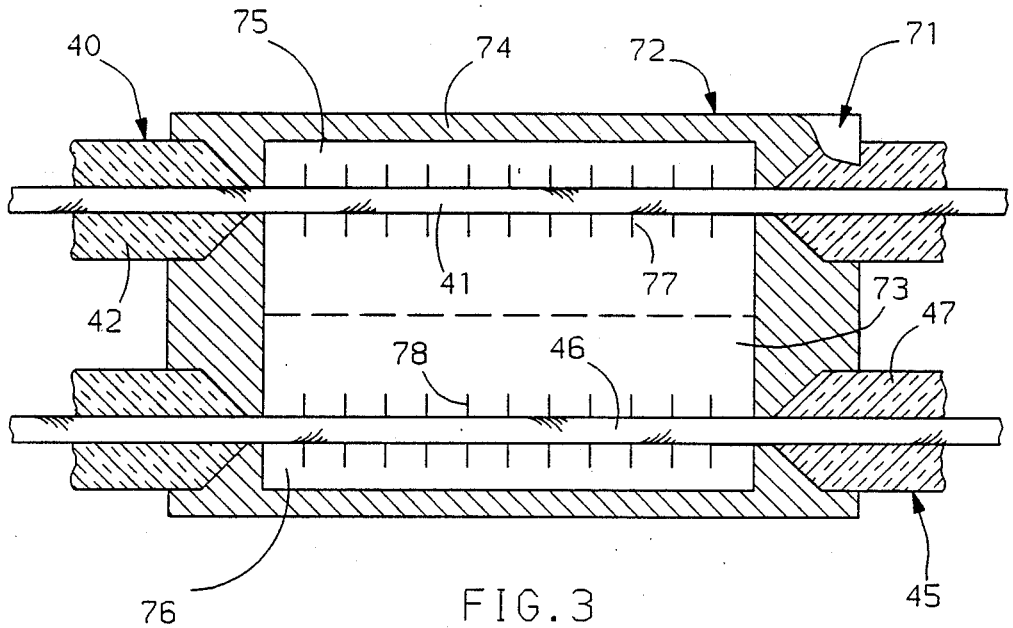
FIG. 3 shows a view within a portion of an alternative embodiment of a micromachined fiber optic pressure sensor having a wall with thick and thin portions and a separate optic fiber parallel to each portion.

Another embodiment of temperature compensation is shown in FIG. 3. The basic structure of the chamber is the same as in the embodiments of FIGS. 4 and 5. A housing comprises opposing wafers or walls 71 and 72 having rims sealingly joined and membranes defining a chamber 73 sealed from the outside environment with a reference pressure therein. FIG. 3 essentially shows a view from inside chamber 73 looking at wafer or wall 72, with rim 74 and a membrane comprising a thick portion 75 and a thin portion 76, the division between portions 75 and 76 being shown as a horizontal dashed line across the center of the membrane. A first optic fiber 40 with a stripped or thinned cladding 42 has a core 41 extending through chamber 73 adjacent and parallel to thick portion 75 of wall 72. An optic grating 77 on thick portion 75 of wall 72 optically couples with core 41. A second optic fiber 45 with a stripped or thinned cladding 47 has a core 46 extending through chamber 73 adjacent and parallel to thin portion 76 of wall 72. An optic grating 78 on thin portion 76 of wall 72 optically couples with core 41. A single LED may inject a single wavelength of light to both fingers; but separate photodiodes or other light intensity detectors are provided for each fiber. Thus, the light affected by each wall is made distinct by its passage through a different fiber rather than by different wavelengths in a single fiber, although different frequencies may be used if desired. This also means that the gratings on the thick and thin portions of the wall may have the same periodicity, related to a single wavelength of the light. A dual fiber sensor of this type may be simpler to manufacture than a single fiber, dual wavelength sensor such as those of FIGS. 4 or 5, but it will probably be larger.

For nonvarying, equal coupling lengths, the relationship in light intensity of light out $P^{out}$ to light in $P^{in}$ for each wavelength or fiber (r=reference, m=measuring) may be expressed:

$$P^{out}_j = P^{in}_j \exp(-k s_j L) \text{ for } j=r,m.$$

For a thermal change, each grating will move equally; and $$[P^{out}_j(Ds_t)]/[P^{out}_j(Ds_t=0)] = \exp(-Ds_t kL) \text{ for } j=r,m,$$

wherein $Ds_t$ is the change in separation between fiber and grating due to temperature change. A similar change occurs due to pressure, but only to the wavelength or fiber affected by the thin wall grating:

$$[P^{out}_m(Ds_p)]/[P^{out}_m(Ds_p=0)] = \exp(-Ds_p kL),$$

wherein $Ds_p$ is the change in separation due to pressure. If both temperature and pressure effects are present, $$P^{out}_m/P^{out}_r = \exp[-(Ds_p + Ds_t - Ds_t)kL],$$

which reduces to $$P^{out}_m/P^{out}_r = \exp(-Ds_p kL).$$

This shows that the temperature effect has been canceled. By taking the log of the ratio, a linear relation between the output and a pressure induced change in the position of the grating can be obtained.

Figure 7:
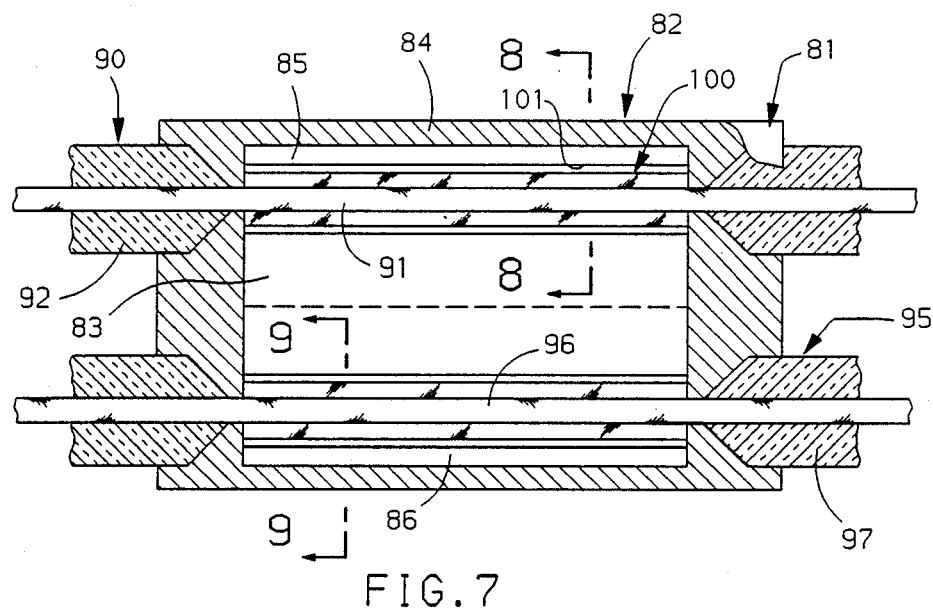
FIG. 7 shows a view within another alternative embodiment of a micromachined fiber optic pressure sensor.
Figure 8:
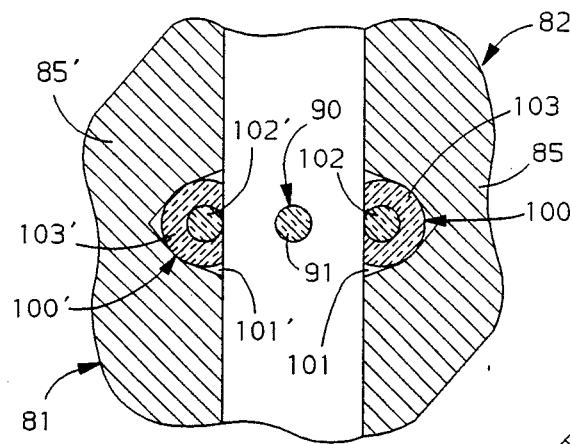
FIGS. 8 and 9 show section views along lines 8—8 and 9—9, respectively, in FIG. 7.
Figure 9:
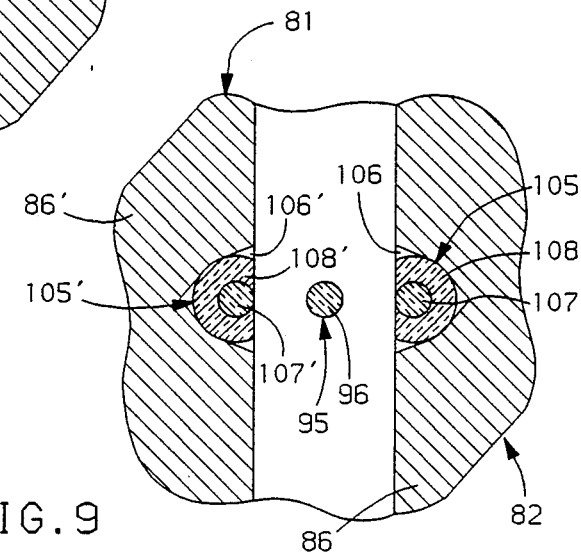

Another mode of coupling is that between a fiber optic core and fiber waveguides embedded in the walls of the housing. An embodiment showing such coupling is shown in FIGS. 7-9, which embodiment is similar to the embodiment of FIG. 3, but which has embedded optic fibers rather than gratings in the walls. A housing comprises opposing wafers or walls 81 and 82 having rims sealingly joined and membranes defining a chamber 83 sealed from the outside environment with a reference pressure therein. FIG. 7 essentially shows a view from inside chamber 83 looking at wafer or wall 82, with rim 84 and a membrane comprising a thick portion 85 and a thin portion 86, the division between portions 85 and 86 being shown as a horizontal dashed line across the center of the membrane. A first optic fiber 90 with a stripped or thinned cladding 92 has a core 91 extending through chamber 83 adjacent and parallel to thick portion 85 of wall 82. A second optic fiber 95 with a stripped or thinned cladding 97 has a core 96 extending through chamber 83 adjacent and parallel to thin portion 86 of wall 82.

A section of optic fiber 100 is retained in a V-groove 101 in thick portion 85 of wall 82 parallel to and adjacent optic fiber 90. The cross section view of FIG. 8 shows that optic fiber 100 comprises a core 102 surrounded by a cladding 103 which is cut off to form a flat continuation of the surface of portion 85 of wall 82 tangent to core 102. Optic fiber 100 is placed so that core 102 thereof is adjacent and parallel to core 91 of optic fiber 90 and close thereto so that light conducted through core 91 will couple with core 102 in degree depending on the distance therebetween. A matching optic fiber 100' with core 102' and cladding 103' may be set in a V-groove 101' in the opposite wall 81, as shown in FIG. 8, to increase the efficiency of coupling.

Similarly, as shown in FIG. 9, a section of optic fiber 105 is laid in a V-groove 106 in thin portion 86 of wall 82 and includes a core 107 adjacent and parallel to core 96 of optic fiber 95 and further includes a cladding 108 cut to form a flat continuation of the surface of portion 86 of wall 82 tangent to core 107. Optic fiber 105 is placed so that core 107 thereof is adjacent and parallel to core 96 of optic fiber 95 and close thereto so that light conducted through core 96 will couple with core 107 in degree depending on the distance therebetween. A matching optic fiber 105' with core 107' and cladding 108' may be set in a V-groove 106' in the opposite wall 82', as shown in FIG. 8, to increase the efficiency of coupling.

A single LED or laser diode may inject a single wavelength of light to both fibers; but separate photodiodes or other light intensity detectors are provided for each fiber to distinguish the light coupled with thick portion 85 of wall 82 from the light coupled with thin portion 86 of wall 82. In this case, for improved coupling, the side fibers 100, 100', 105, 105' and central fiber cores 91, 96 may be be polished or etched. Since only forward coupling is possible between guided waves supported by center and side fibers, careful control of interaction length is required as shown in FIG. 6. Backward coupling, however, can be excited by etching gratings in the side fibers, which gratings are matched in periodicity to the wavelength of the light used.

The embodiments of the invention in which an exclusive property or privilege is claimed are defined as follows:

1. A pressure sensor comprising, in combination:
    A pair of wall members, at least one of the wall members having a membrane portion surrounded by a rim, the pair of wall members being joined with the rim of the one wall member in a sealing arrangement with the other wall member to form a chamber therebetween sealed from the outside environment with a reference pressure therein, at least a portion of the membrane portion of the one wall member being sufficiently thin to allow flexure with variations in pressure in the outside environment relative to the reference pressure in the cavity and having an optical grating formed thereon with a predetermined periodicity;
    optic fiber means extending through the cavity adjacent and parallel to the membrane portion and sufficiently close thereto to allow coupling of light of a predetermined frequency therein to the optical grating;
    means for generating and providing to the optic fiber means light of the predetermined wavelength having a coupling relationship to the periodicity of the optical grating such that loss of light from the optic fiber means varies with the separation between the optic fiber means and wall portion and thus with the pressure of the outside environment relative to the reference pressure;
    light detection and signal generating means effective to sense the amount of light of the predetermined wavelength conducted through the optic fiber means in comparison with a reference indicative of the amount of light provided to the optic fiber means and generate a signal therefrom varying with pressure outside the chamber.

2. A pressure sensor according to claim 1 in which the other wall member also comprises a membrane portion surrounded by a rim and at least a portion of the membrane portion of the other wall member is sufficiently thin to allow flexure with variations in pressure in the outside environment relative to the reference pressure in the chamber, has an optical grating formed thereon with the predetermined periodicity and is parallel to the optic fiber in optic coupling relationship therewith.

3. A pressure sensor according to claim 1 in which the predetermined wavelength of the light and the periodicity of the grating provide Bragg coupling between the optic fiber and the membrane.

4. A pressure sensor according to claim 1 in which the grating is coated with a surface plasmon supporting substance and the wavelength of the light and periodicity of the grating provide coupling of a guided wave in the optic fiber to a surface plasmon on the membrane.

5. A pressure sensor according to claim 1 in which the wall members comprise a compensation portion which is sufficiently thick to be unresponsive, in comparison with the thin portion of the membrane, to the variations in pressure but varying similarly to the thin portion of the membrane with variations in temperature, the compensation portion comprising a grating for coupling to an identifiably distinct portion of light in the optic fiber means, the light detection and signal generating means being further effective to sense the amount of the identifiably distinct portion of light transmitted through the optic fiber means and use it as the reference to compensate the signal for temperature variations.

* * * * *